United States Patent [19]

Bartilucci

[11] Patent Number: 5,663,707

[45] Date of Patent: Sep. 2, 1997

[54] SIGNALLING LIGHT VISIBLE THROUGH A REAR VIEW WINDOW OF A VEHICLE

[76] Inventor: Gary M. Bartilucci, 6 Candy La., Hopewell Junction, N.Y. 12533

[21] Appl. No.: 675,242

[22] Filed: Jul. 2, 1996

Related U.S. Application Data

[63] Continuation-in-part of Ser. No. 420,115, Apr. 11, 1995.
[51] Int. Cl.$^6$ ........................................ B60Q 1/50
[52] U.S. Cl. ...................... 340/464; 340/467; 340/471; 340/472; 340/479; 362/61
[58] Field of Search .......................... 340/464, 463, 340/467, 465, 479, 466, 468, 469, 470, 461, 471, 472; 116/35 R, 56; 362/61

[56] References Cited

U.S. PATENT DOCUMENTS

| | | | |
|---|---|---|---|
| 4,891,625 | 1/1990 | Van Riper et al. | 340/479 |
| 4,933,666 | 6/1990 | Maple | 340/464 |
| 5,164,701 | 11/1992 | Nau-Mu et al. | 340/464 |

*Primary Examiner*—Jeffery Hofsass
*Assistant Examiner*—Daryl C. Pope

[57] ABSTRACT

A signalling light visible through a rear window of a vehicle including a primary electrically energizable signaling light unit having a first array of green light-emitting diodes, a second array of red light-emitting diodes, and a third array of yellow light-emitting diodes. A pair of secondary electrically energizable signaling light units including a fourth array of red light-emitting diodes are positioned at a left extent of the rear window and a fifth array of red light-emitting diodes are positioned at a right extent of the rear window.

1 Claim, 3 Drawing Sheets

SIGNALLING LIGHT VISIBLE THROUGH A REAR VIEW WINDOW OF A VEHICLE

The present invention is a continuation-in-part of parent application filed Apr. 11, 1995 under Ser. No. 08/420,115.

BACKGROUND OF THE INVENTION

1. Field of the Invention

The present invention relates to a signalling light visible through a rear window of a vehicle and more particularly pertains to signalling a lead driver's intent in a rearward direction from a rear window of a vehicle and further utilizing a following driver's conventional attention to the rear window and associated brake light to indicate to him that a lead driver is preparing for a turn.

2. Description of the Prior Art

The use of brake lights is known in the prior art. More specifically, brake lights heretofore devised and utilized for the purpose of indicating deceleration are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,921,750 to Shames discloses a vehicle brake warning light system accelerator pedal switch. U.S. Pat. No. 4,918,424 to Sykora discloses a two-stage brake light system. U.S. Pat. No. 4,933,666 to Maple discloses an initial brake warning light assembly. U.S. Pat. No. 5,150,098 to Rakow discloses a brake signaling system and process. U.S. Pat. No. 5,210,522 to Hockman et al. discloses an early warning brake light actuated by the accelerator pedal. U.S. Pat. No. 5,254,910 to Yang discloses a color-deferential-type light display device.

In this respect, the signalling light visible through a rear window of a vehicle according to the present invention substantially departs from the conventional concepts and designs of the prior art, and in so doing provides an apparatus primarily developed for the purpose of signalling a lead driver's intent in a rearward direction from a rear window of a vehicle and further utilizing a following driver's conventional attention to the rear window and associated brake light to indicate to him that a lead driver is preparing for a turn.

Therefore, it can be appreciated that there exists a continuing need for a new and improved signalling light visible through a rear window of a vehicle which can be used for signalling a lead driver's intent in a rearward direction from a rear window of a vehicle and further utilizing a following driver's conventional attention to the rear window and associated brake light to indicate to him that a lead driver is preparing for a turn. In this regard, the present invention substantially fulfills this need.

SUMMARY OF THE INVENTION

In view of the foregoing disadvantages inherent in the known types of brake lights now present in the prior art, the present invention provides an improved signalling light visible through a rear window of a vehicle. As such, the general purpose of the present invention, which will be described subsequently in greater detail, is to provide a new and improved signalling light visible through a rear window of a vehicle which has all the advantages of the prior art and none of the disadvantages.

To attain this, the present invention essentially includes a primary electrically energizable signaling light unit having a rectangular planar clear flexible plastic casing with three rectangular recesses formed therein, a layer of adhesive disposed upon an outwardly positioned surface of the casing for allowing the securement thereof to a center of a rear window of a vehicle, a rectangular cut out formed thereon for allowing the unit to fit snugly about an upper extent of a central braking light of a vehicle, a pair of rigid brackets integral with and extended downwards from the casing and further including a circular through hole formed on a lower extent thereof for receiving a fastener thereby allowing the securement thereof to a recipient surface, a first array of green light-emitting diodes arranged in a rectangular matrix within one of the recesses, a second array of red light-emitting diodes arranged in a rectangular matrix and secured within another of the recesses, and a third array of yellow light-emitting diodes arranged in a rectangular matrix and secured within the remaining recess and with each of the arrays covered with a translucent plastic sheet for defocusing light emitted therefrom to essentially project a collimated beam; a pair of secondary electrically energizable signaling light units each having a rectangular planar clear flexible plastic casing with a rectangular recess formed therein, a layer of adhesive disposed upon an outwardly positioned surface of the casing for allowing the securement thereof to opposite ends of the rear window of the vehicle, a rigid bracket integral with and extended downwards from the casing and further including a circular through hole formed on a lower extent thereof for receiving a fastener thereby allowing the securement thereof to a recipient surface, a fourth array of red light-emitting diodes arranged in a rectangular matrix and secured within the recess of one of the secondary units wherein the fourth array is positioned at a left extent of the rear window, a fifth array of red light-emitting diodes arranged in a rectangular matrix and secured within the recess of the other secondary unit wherein the fifth array is positioned at a right extent of the rear window; a multi-conductor sheathed electrical power cable having five proximal terminal ends a distal plug end and with each terminal end extended through a grommet on the casing and further separately coupled to one of the arrays for providing electrical energy to the corresponding light-emitting diodes; first pressure sensitive switch coupled to an accelerator pedal of the vehicle for transmitting an acceleration indication signal when the vehicle's accelerator pedal is depressed; second pressure sensitive switch coupled to a brake pedal of the vehicle for transmitting a braking indication signal when the vehicle's brake pedal is depressed; third switch coupled to a lever of a transmission system of the vehicle for transmitting an enabling signal when a transmission of the vehicle is placed in a mode of operation for traveling forwards; fourth switch coupled to a turn signal lever for transmitting a left turn indication signal upon the lowering of the turn signal lever and a right turn indication signal upon the raising of the turn signal lever; and electrically energizable logic circuitry coupled to the plug end of the power cable and to the first, the second, the third switch, and the fourth switch and further couplable to a power supply of the vehicle for enabling the signaling light system based upon receipt of the enabling signal, energizing only the first array based upon receipt of the acceleration indication signal and the enabling signal, energizing only the second array, the fourth array, and the fifth array based upon receipt of the braking indication signal and the enabling signal, energizing the fourth array intermittently upon receipt of the left turn indication signal in combination with the braking indication signal and the enabling signal, and energizing the fifth array intermittently upon receipt of the right turn indication signal in combination with the braking indication signal and the enabling signal, the logic circuitry comprising a NOR gate for energizing only the third array upon receipt of only the enabling signal.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved signalling light visible through a rear window of a vehicle which has all the advantages of the prior art brake lights and none of the disadvantages.

It is another object of the present invention to provide a new and improved signalling light visible through a rear window of a vehicle which may be easily and efficiently manufactured and marketed.

It is a further object of the present invention to provide a new and improved signalling light visible through a rear window of a vehicle which is of a durable and reliable construction.

An even further object of the present invention is to provide a new and improved signalling light visible through a rear window of a vehicle which is susceptible of a low cost of manufacture with regard to both materials and labor, and which accordingly is then susceptible of low prices of sale to the consuming public, thereby making such signalling light visible through a rear window of a vehicle economically available to the buying public.

Still yet another object of the present invention is to provide a new and improved signalling light visible through a rear window of a vehicle which provides in the apparatuses and methods of the prior art some of the advantages thereof, while simultaneously overcoming some of the disadvantages normally associated therewith.

Still another object of the present invention is to signal a lead driver's intent in a rearward direction from a rear window of a vehicle and further utilize a following driver's conventional attention to the rear window and associated brake light to indicate to him that a lead driver is preparing for a turn.

Lastly, it is an object of the present invention to provide a new and improved signalling light visible through a rear window of a vehicle including a primary electrically energizable signaling light unit having a first array of green light-emitting, a second array of red light-emitting diodes, and a third array of yellow light-emitting diodes; a pair of secondary electrically energizable signaling light units including a fourth array of red light-emitting diodes positioned at a left extent of the rear window and a fifth array of red light-emitting diodes positioned at a right extent of the rear window; first switch means coupled to an accelerator pedal of a vehicle for transmitting an acceleration indication signal when a vehicle's accelerator pedal is depressed; second switch means coupled to a brake pedal of a vehicle for transmitting a braking indication signal when a vehicle's brake pedal is depressed; third switch means coupled to a transmission system of a vehicle for transmitting an enabling signal when a transmission of a vehicle is placed in a mode of operation for traveling forwards; and fourth switch means coupled to a turn signal lever for transmitting a left turn indication signal upon the lowering of the turn signal lever and a right turn indication signal upon the raising of the turn signal lever; and electrically energizable logic circuitry means coupled to the light unit and the first, the second, and the third switch means and further couplable to a power supply of a vehicle for enabling the brake signaling light system based upon receipt of the enabling signal, energizing only the first array based upon receipt of the acceleration indication signal, energizing only the second array based upon receipt of the braking indication signal, energizing the fourth array intermittently upon receipt of the left turn indication signal in combination with the braking indication signal, energizing the fifth array intermittently upon receipt of the right turn indication signal in combination with the braking indication signal, and energizing only the third array otherwise.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
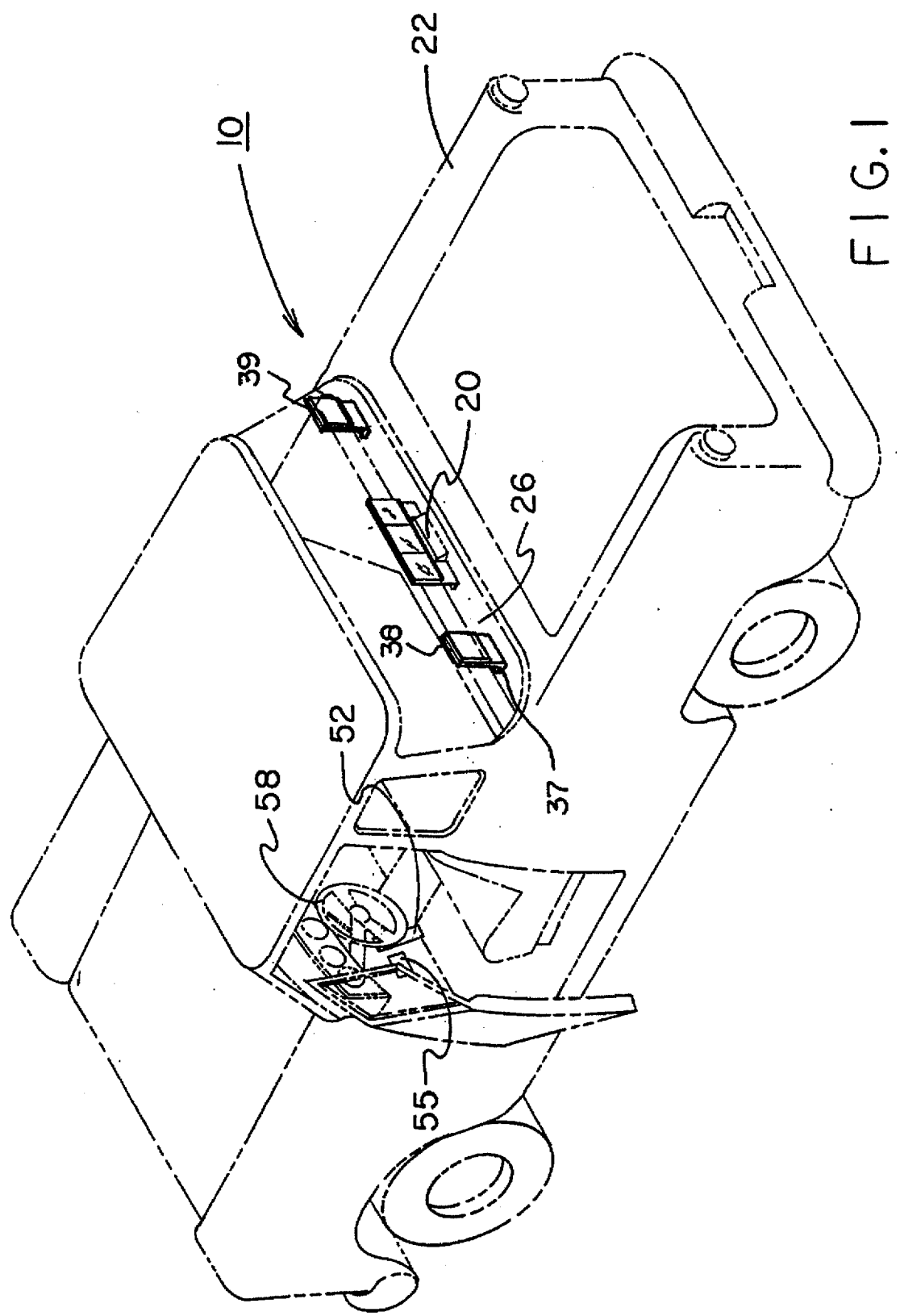
FIG. 1 is a perspective illustration of the preferred embodiment of the signalling light visible through a rear window of a vehicle constructed in accordance with the principles of the present invention.

With reference now to the drawings, and in particular to FIG. 1 thereof, a new and improved signalling light visible through a rear window of a vehicle embodying the principles and concepts of the present invention and generally designated by the reference numeral 10 will be described.

The present invention, the new and improved signalling light visible through a rear window of a vehicle, is comprised of a plurality of components. Such components in their broadest context include a primary signaling light unit, a pair of secondary light units, cables, switch mechanisms, and logic circuitry. Such components are individually configured and correlated with respect to each other so as to attain the desired objective.

Specifically, the present invention includes a primary electrically energizable signaling light unit 12. The signaling light unit has a rectangular planar casing 14. The casing is formed of a clear flexible plastic. A layer of adhesive 15 is disposed upon an outwardly positioned surface of the casing for allowing it to be secured to a recipient facing surface such as a central extent of a window of a vehicle like that shown in FIG. 1. In addition, the casing 14 has three rectangular recesses 16 formed thereon. A rectangular cutout 18 is formed on the casing at a lower extent thereof to allow it to fit snugly about an upper extent of an external central braking light 20 of a vehicle. The signaling light unit 12 also includes a pair of L-shaped rigid brackets 24. The brackets are integral with and extended downwards from the casing 12. Each bracket has a circular through hole formed on a lower extent thereof. Each through hole is sized for receiving a fastener for securing the associated bracket to a recipient surface like a rear dash 26 of a vehicle.

A first array of green light-emitting diodes 30 are arranged in a rectangular matrix and secured within one of the recesses. A second array of red light-emitting diodes 32 are arranged in a rectangular matrix and secured within another of the recesses. Lastly, a third array of 34 of yellow light-emitting diodes arranged in a rectangular matrix is secured within the remaining recess. Each matrix is illuminated and provides a signal indicative of a driver's intent when operating vehicle controls. Each of the arrays is covered with a translucent plastic sheet 36. The plastic sheet essentially defocuses the light emitted from each diode to essentially project a collimated beam from the matrix.

Also included are a pair of secondary electrically energizable signaling light units 37, as shown in FIG. 1. The secondary light units have structure similar to the primary light unit. Each secondary light unit has a rectangular planar clear flexible plastic casing with a rectangular recess formed therein. A layer of adhesive is disposed upon an outwardly positioned surface of the casing for allowing the securement thereof to opposite ends of the rear window of the vehicle. A rigid bracket is integral with and extended downwards from the casing. A circular through hole is formed on a lower extent of the bracket for receiving a fastener thereby allowing the securement thereof to a recipient surface, preferably adjacent the rear window. A fourth array 38 of red light-emitting diodes is arranged in a rectangular matrix and secured within the recess of one of the secondary units. The fourth array is positioned at a left extent of the rear window. A fifth array 39 of red light-emitting diodes is arranged in a rectangular matrix and secured within the recess of the other secondary unit. The fifth array is positioned at a right extent of the rear window.

Figure 2:
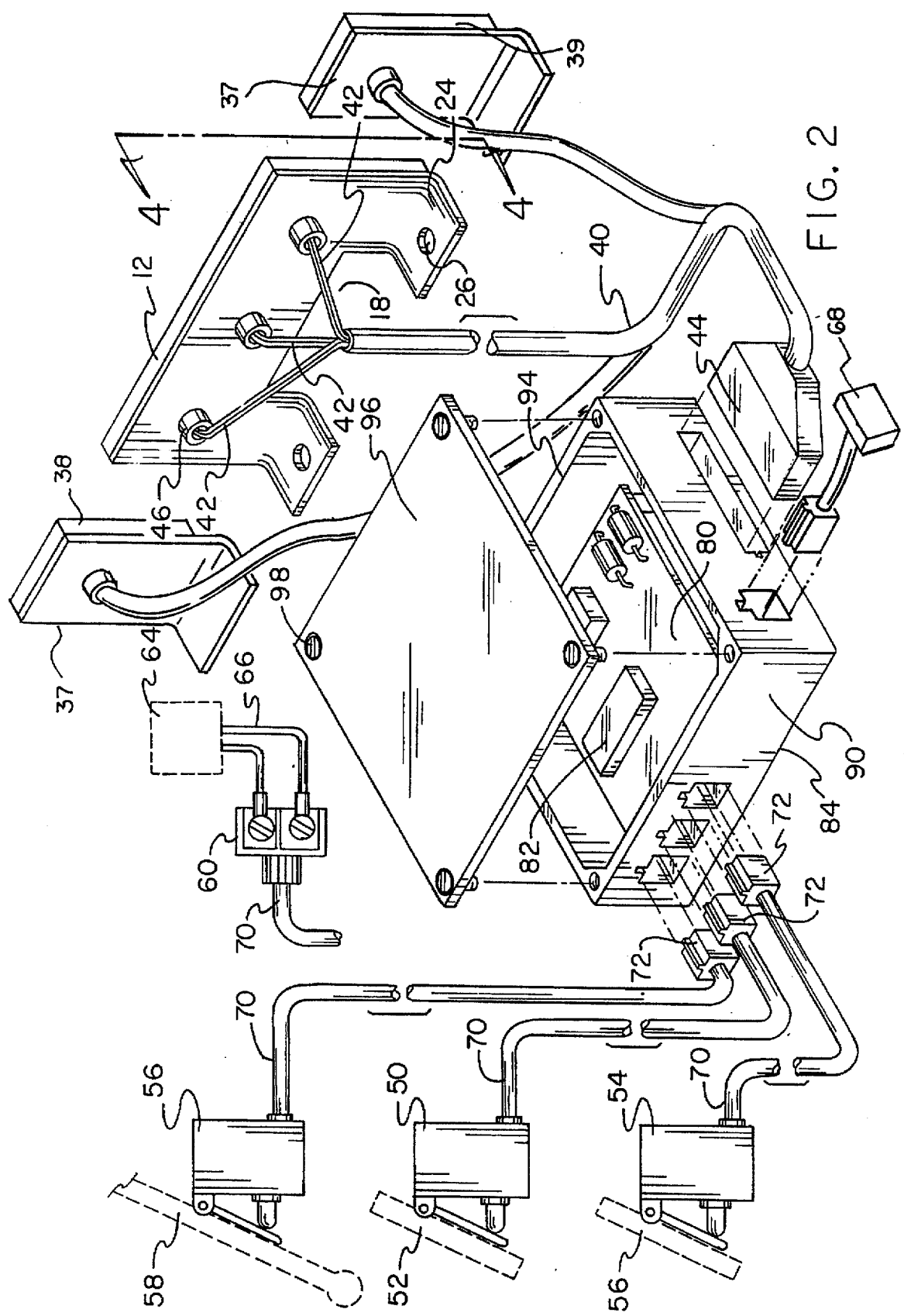
FIG. 2 is an exploded perspective view of the preferred embodiment of the present invention.

As shown in FIG. 2, a multi-conductor sheathed electrical power cable 40 is provided. The power cable includes 5 wire conductors bundled together in a general branded configuration. The power cable has five exposed proximal terminal ends 42 and a distal plug end 44. Each terminal end is extended through a grommet 46 on the casing and then separately coupled to one of the arrays. A power cable is used for providing electrical energy to the corresponding light-emitting diodes from an external source.

A first pressure sensitive switch mechanism 50 is included and coupled to an accelerator pedal 52 of a vehicle. The switch mechanism has one orientation for transmitting an acceleration indication signal when a vehicle's accelerator pedal is depressed by a driver. The first pressure switch mechanism also has another orientation for transmitting a signal that indicates that the accelerator pedal is not depressed.

A second pressure sensitive switch mechanism 54 is coupled to a brake pedal 55 of the vehicle. The second switch mechanism transmits a braking indication signal when a vehicle's brake pedal is depressed. The second switch mechanism also has another orientation for transmitting a signal that indicates that the brake pedal is not depressed. A third pressure sensitive switch mechanism 56 is coupled to a driver-actuatable lever 58 of a transmission system of a vehicle. The third pressure switch mechanism 56 transmits an enabling signal when a transmission of a vehicle is placed in a mode of operation for allowing the vehicle to travel forwards. The third switch mechanism also has another orientation for transmitting a disabling signal that indicates that the vehicle is placed in a mode of operation for not traveling forwards. In an alternate embodiment, the third switch mechanism 56 essentially receives a signal from a detector unit 64 of a manual transmission system through a line 66. This signal indicates whether the manual transmission system is in a mode of operation for traveling forwards. Lastly, a fourth switch 68 is coupled to a turn signal lever of the vehicle. Such switch is included for transmitting a left turn indication signal upon the lowering of the turn signal lever and a right turn indication signal upon the raising of the turn signal lever. Each of the switch mechanisms have a line 70 extended therefrom and terminated at a connector jack 72.

Lastly, an electrically energizable logic circuitry mechanism 80 is coupled to the plug end 44 of the power cable and to the first switch mechanism 50, the second switch mechanism 54, the third switch mechanism 56, and the fourth switch mechanism 74. The logic circuitry mechanism is further couplable to a power supply of a vehicle. The logic circuitry mechanism includes logic gates contained in integrated circuits 82 that are emplaced on a printed circuit board 84. In addition, the logic circuitry mechanism is contained in a rigid box-shaped container 90 with an open top 94. A lid 96 is removably securable over the top 94 with fasteners 98.

Figure 3:
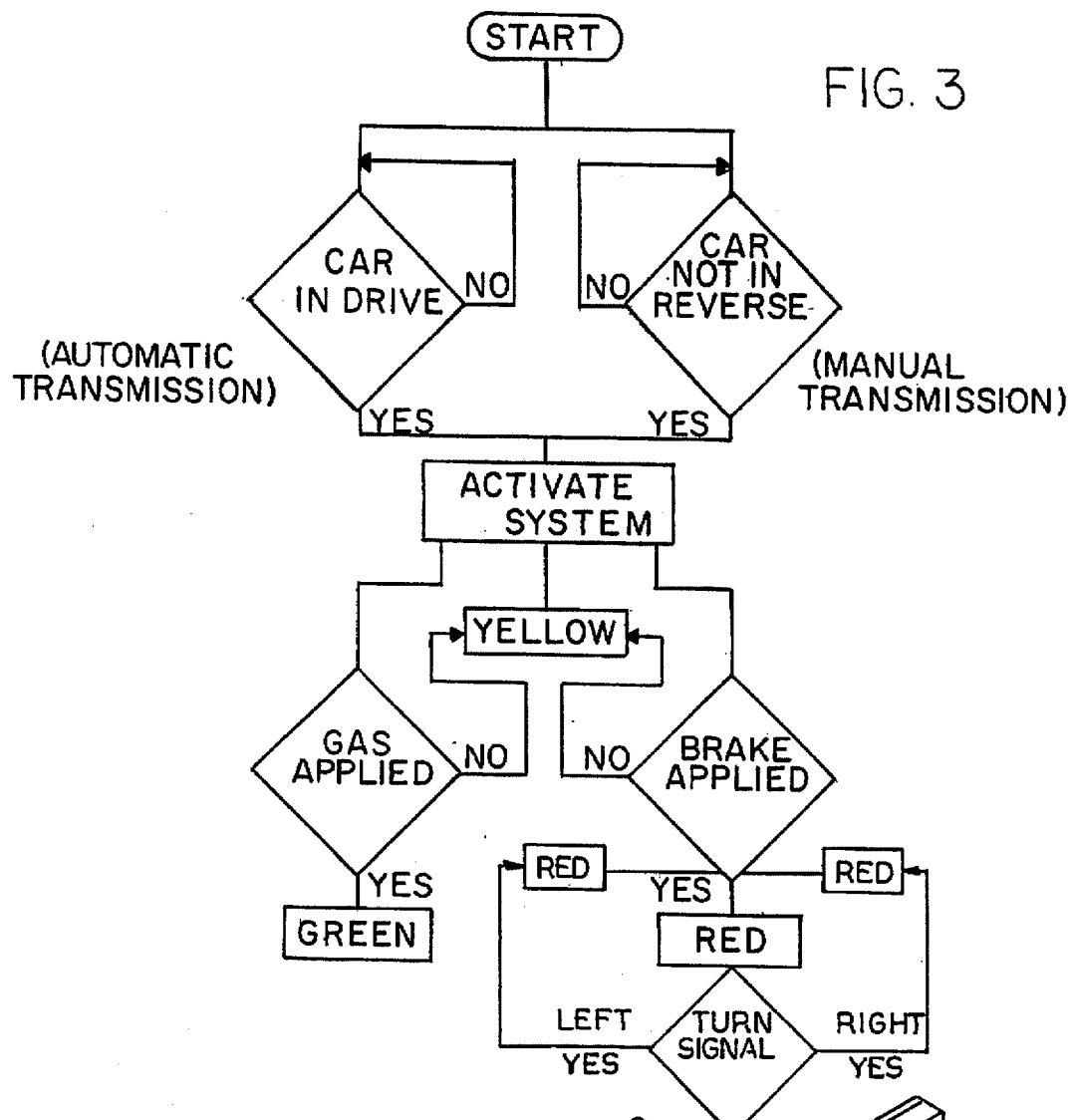
FIG. 3 is a state transition diagram for the present invention.
Figure 4:
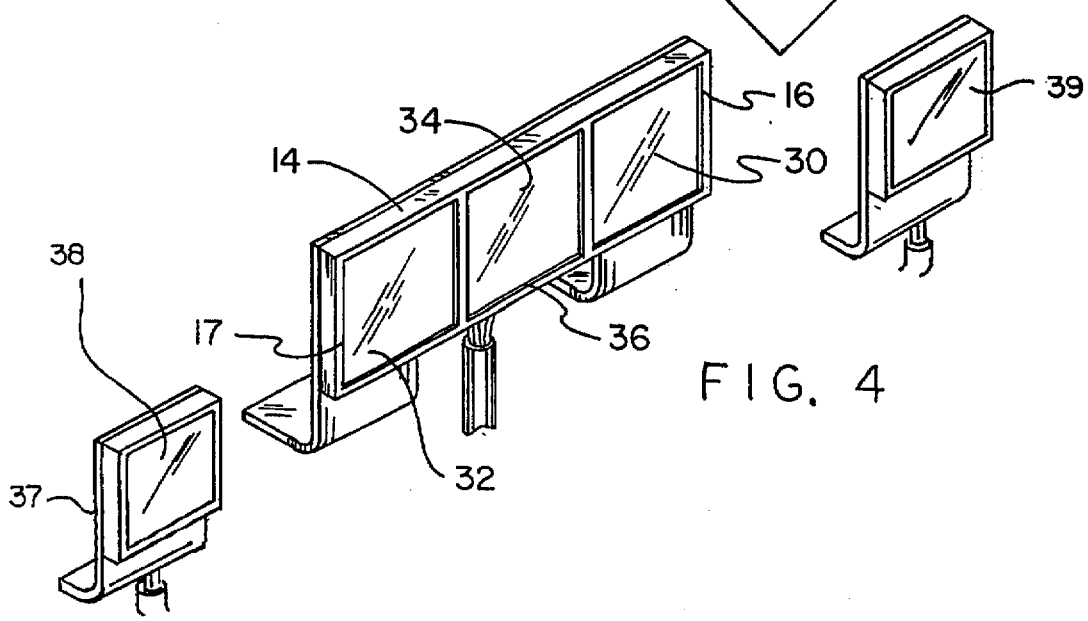
FIG. 4 is a perspective view of the signaling light unit of the present invention.

Operation of the present invention is best illustrated in FIG. 3. The logic circuitry mechanism 80 enables the brake signaling light system 10 based upon receipt of the enabling signal from the third switch mechanism 56. If the disabling from the third switch mechanism signal is received, the system 10 is deactivated. The logic circuitry mechanism energizes only the first array 30 based upon receipt of the acceleration indication signal when the acceleration pedal is depressed. If this signal is not received, the array 30 is not illuminated. The logic circuitry mechanism also energizes only the second array, fourth array, and the fifth array based upon receipt of the braking indication signal when the brake pedal is depressed. If no braking indication signal is received, the aforementioned arrays are not energized. To indicate braking in combination with a left turn, the fourth array is energized intermittently upon receipt of the left turn indication signal in combination with the braking indication signal and the enabling signal. Also, the fifth array is energized intermittently upon receipt of the right turn indication signal in combination with the braking indication signal and the enabling signal. As such, the secondary lights utilize a following driver's conventional attention to the rear window and associated central brake light to indicate to him that a lead driver is preparing for a turn. Lastly, the logic circuitry mechanism energizes only the third array when the system is activated and neither the acceleration pedal nor the brake pedal is depressed. Thus, the third array 36 provides a cautionary signal to a rearwardly positioned vehicle that indicates that a driver has not applied pressure to the accelerator or the brake pedal. Thus, when the red light is activated, a rearwardly positioned driver knows that the driver in question has applied his brakes. When the green light is illuminated, the rearwardly positioned driver knows that the driver in question has applied pressure to the accelerator. And consequently, when the yellow light is illuminated, the rearwardly positioned driver knows that the driver in question has removed pressure from both the gas and brake pedals.

The present invention includes high reliability microswitches mounted directly to the accelerator and the brake pedals. The exact type of micro-switch used may depend on the geometry of the gas or brake pedals, which of course vary from car to car. These switches are connected to two LED arrays—one green and one red. The two switches are connected to a two port input NOR gate. The NOR gate may be thought of as a switch that is on only if both of its inputs are off. The output of the NOR gate is attached to a yellow LED array. Thus, the red arrays are illuminated when the brake pedal is depressed. The green array is illuminated when the accelerator is depressed, and the yellow array is illuminated only when neither the accelerator pedal nor the brake pedal is depressed. A third micro-switch can also be affixed to the transmission (or shift lever) of the vehicle. This third micro-switch will cause the system to off when the transmission is placed in reverse (or park).

The lighting unit of the present invention is comprised of three LED arrays. The arrays are mounted in the side of a flexible plastic or rubber rectangular planar casing measuring about 12 inches long by about 4 inches wide by about ⅜ inches thick. The casing has a clear self-adhesive border. This border allows the light unit to be affixed to the interior of a rear window of a vehicle in much the same way that a window decal may be applied. The lower extent of the casing has a cutout area that may be removed so that the unit will fit around the interior brake light that is found on newer cars.

In the case of automatic transmissions, the drive indicator switch unit must be located on or near the shift lever. This is because most vehicles do not have any ability in electronic means of detecting when the transmission is in drive. A different situation exists with manual transmission equipped vehicles. Manual transmissions (which of course have no drive position) do have a detector switch which turns on the back up lights when you shift into reverse. Thus, instead of using a switch attached to the switch lever, one could use an electronic switching unit which is capable of detecting when the back up lights are on (cars in reverse) and then set the on/off switch accordingly.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A signalling light visible through a rear window of a vehicle for signaling a driver's intent in a rearward direction based upon actuation of vehicle controls such as an accelerator pedal, a brake pedal, a lever of the vehicle's transmission system, and a turn signal lever comprising, in combination:

a primary electrically energizable signaling light unit having a rectangular planar clear flexible plastic casing with three rectangular recesses formed therein, the casing measuring about 12 inches long by about 4 inches wide by about ⅜ inches thick, a layer of adhesive disposed upon an outwardly positioned surface of the casing for allowing the securement thereof to a center of a rear window of a vehicle, a rectangular cut out formed thereon for allowing the unit to fit snugly about an upper extent of a central braking light of a vehicle, a pair of rigid L-shaped brackets integral with and extended downwards from the casing and further including a circular through hole formed on a lower extent thereof for receiving a fastener thereby allowing the securement thereof to a recipient surface, a first array of green light-emitting diodes arranged in a rectangular matrix within one of the recesses, a second array of red light-emitting diodes arranged in a rectangular matrix and secured within another of the recesses, and a third array of yellow light-emitting diodes arranged in a rectangular matrix and secured within the remaining recess and with each of the arrays covered with a translucent plastic sheet for defocusing light emitted therefrom to essentially project a collimated beam;

a pair of secondary electrically energizable signaling light units each having a rectangular planar clear flexible plastic casing with a rectangular recess formed therein, a layer of adhesive disposed upon an outwardly positioned surface of the casing for allowing the securement thereof to opposite ends of the rear window of the vehicle, a L-shaped rigid bracket integral with and extended downwards from the casing and further including a circular through hole formed on a lower extent thereof for receiving a fastener thereby allowing the securement thereof to a recipient surface, a fourth array of red light-emitting diodes arranged in a rectangular matrix and secured within the recess of one of the secondary units wherein the fourth array is positioned at a left extent of the rear window, a fifth array of red light-emitting diodes arranged in a rectangular matrix and secured within the recess of the other secondary unit wherein the fifth array is positioned at a right extent of the rear window;

a multi-conductor sheathed electrical power cable having five proximal terminal ends a distal plug end and with each terminal end extended through a grommet on the casing and further separately coupled to one of the arrays for providing electrical energy to the corresponding light-emitting diodes;

first pressure sensitive switch coupled to an accelerator pedal of the vehicle for transmitting an acceleration indication signal when the vehicle's accelerator pedal is depressed;

second pressure sensitive switch coupled to a brake pedal of the vehicle for transmitting a braking indication signal when the vehicle's brake pedal is depressed;

third switch coupled to a lever of a transmission system of the vehicle for transmitting an enabling signal when a transmission of the vehicle is placed in a mode of operation for traveling forwards, wherein the enabling signal is received from a detection unit of the transmission system;

fourth switch coupled to a turn signal lever for transmitting a left turn indication signal upon the lowering of the turn signal lever and a right turn indication signal upon the raising of the turn signal lever; and electrically energizable logic circuitry situated within a rigid box shaped container with an open top and a lid removably secured thereto, the logic circuitry coupled to the plug end of the power cable and to the first, the second, the third switch, and the fourth switch and further couplable to a power supply of the vehicle for enabling the signaling light system based upon receipt of the enabling signal, energizing only the first array based upon receipt of the acceleration indication signal and the enabling signal, energizing only the second array, the fourth array, and the fifth array based upon receipt of the braking indication signal and the enabling signal, energizing the fourth array intermittently upon receipt of the left turn indication signal in combination with the braking indication signal and the enabling signal, and energizing the fifth array intermittently upon receipt of the right turn indication signal in combination with the braking indication signal and the enabling signal, the logic circuitry comprising a NOR gate for energizing only the third array upon receipt of only the enabling signal;

whereby the secondary electrically energizable signaling light units utilize a following driver's conventional attention to the rear window and associated central brake light to indicate that a lead driver is both braking and preparing for a turn.

* * * * *